United States Patent [19]
Barley

[11] 3,807,691
[45] Apr. 30, 1974

[54] STOPCOCK FOR VACUUM AND HERMETIC USAGES

[76] Inventor: Kenneth D. Earley, 1611 Stearns Hill Rd., Waltham, Mass. 02154

[22] Filed: May 23, 1973

[21] Appl. No.: 363,008

[52] U.S. Cl.............. 251/309, 251/209, 251/188
[51] Int. Cl............................................ F16k 5/04
[58] Field of Search ........... 251/309, 192, 188, 181, 251/209

[56] References Cited
UNITED STATES PATENTS

| | | | |
|---|---|---|---|
| 3,698,683 | 10/1972 | DeAngelis | 251/309 X |
| 3,475,002 | 10/1969 | Phillips | 251/209 X |
| 3,305,211 | 2/1967 | Phillips | 251/209 X |
| 1,493,133 | 5/1924 | Sykora | 251/209 X |
| 2,067,346 | 1/1937 | Rovinsky | 251/209 X |

*Primary Examiner*—William R. Cline
*Assistant Examiner*—Ira S. Lazarus

[57] ABSTRACT

A valve, stopcock, or petcock which includes the combination of (a) a tubular body, the wall portion of which is provided with connecting conduits, or conduit connections, (b) a cylindrical shaped tubular plug of resilient material provided with an external circumferential groove, rotatably mounted within the tubular body, of arc length less than 360° but of sufficient length to give congress with the connecting conduits, or conduit connections, (c) a bolt having a shaft segment, and a splined surface, which mates with the wall forming the axial opening through the plug for rotation of the latter, said shaft being threaded at one end and including at the other and a projection provided with an inner face for abuttment with an outer face of the plug, and an external handle, or knob, and (d) a nut or nut-like member provided with a projection having an inside face which can be abutted with an outer face of the plug, said member being engageable with the threaded end of the shaft so that the plug can be compressed between the opposed faces of the projections of the said bolt and nut, or nut-like member, and caused to bulge, expand or extrude against the inner wall of the tubular body to form an effective leak-proof seal.

11 Claims, 5 Drawing Figures

PATENTED APR 30 1974  3,807,691

STOPCOCK FOR VACUUM AND HERMETIC USAGES

This invention relates generally to valves, especially to stopcocks and petcocks. The stopcocks have particular utility in laboratory glass apparatus. Petcocks are essentially metal versions of stopcocks and are generally used without lubrication in low pressure applications such as heating gas lines.

Valves, stockcocks and petcocks have been long known to the art. Stopcocks and petcocks are comprised of a housing or body, the tapered wall portion of which is provided with conduit connections, or conduit segments, connected therethrough. In both stopcocks and petcocks, the axial opening through the housing is thus generally conical-shaped, and a frusto-conic shaped mating plug, the stem portion of which is provided with a laterial opening therethrough, is rotatably mounted within the said axial opening, the lateral opening in the stem on rotation giving congress to the conduit connections.

A major problem in the construction of conventional valves, stopcocks, and petcocks involves creation of an air-tight fit between the rotatable plug and the wall of the tubular body. Such apparatus is particularly unsuitable for high vacuum or hermetic applications. Leakage is prevalent in known devices. O-ring seals cannot be used without a thin coating of grease. O-ring seals, and grease sealants, have severe limitations. Grease is a source of contamination, and is quite messy to use. It tends to obstruct openings and interfere with the passage of fluids. Due to interaction with chemicals, and from the results of oxidation, the grease has a tendency to stiffen and freeze, resulting in extreme difficulty in opening and closing stopcocks. Cleaning is difficult, particularly the cleaning of the lateral opening through the plug. Grease is also a source of gas, this constituting at best the equivalent of a leak in vacuum applications.

It is, accordingly, a principal object of the present invention to obviate the foregoing and other prior art problems by providing a new and improved valve, stopcock, or petcock.

Among the specific objectives of this invention are the following:

To provide a valve, stopcock, or petcock especially suitable for vacuum and hermetic applications, particularly one which does not require the use of O-rings or grease as sealants.

To provide a valve, stopcock, or petcock which is relatively inexpensive, durable, relatively simple, easy to install, maintain, disassemble and keep clean, and whose engaging surfaces can be readily moved during operation without breaking the seal.

These and other objects are achieved in accordance with the present invention embodying apparatus constituting a valve, stopcock, or petcock, including generally the combination of (a) a tubular body, formed by an enclosing wall defining an axial opening therethrough, with connecting conduits or connections for said conduits located in said wall, (b) a cylindrical shaped tubular plug mounted within the axial opening through said tubular body, said plug being constructed of a resilient or elastic material, and being provided with an external groove of sufficient arc length to give congress with the connecting conduits, or conduit connections, to "open" the stopcock, on rotation of said member within the axial opening of said tubular body, but of arc length less than 360° so that an ungrooved segment, or smooth face, of the plug can be interposed between the connecting conduits, or conduit connections, to "close" the stopcock, or petcock, (c) a bolt having a splined shaft which meshes with the axial opening of the plug so that rotation of said bolt, or shaft, will produce a corresponding rotation of said plug, one terminal end of said bolt being threaded, the other terminal end of said bolt being provided with a projection having an inside face which can be brought into abuttment with an outer face of the plug, and means, preferably a handle or knob, adjacent the said projection and permanently located outside the axial opening of said tubular body so that the bolt, and shaft portion thereof, can be manipulated and rotated from a position outside the axial opening of the said tubular body, and (d) a nut or nut-like member, provided with a projection having an inside face which can be abutted with an outer face of the plug, threadably engaged with the threaded end of the shaft of said bolt so that the effective length of the shaft can be shortened or lengthened, on rotation of the shaft, such that the plug can be compressed between the opposed faces of the projections of the bolt and nut, respectively, thereby causing the plug to bulge, expand or extrude outwardly against the inner wall of the tubular body to form an effective leak-proof seal.

In an additional embodiment, circumferential continuous ridge or rim surfaces are provided on the faces of the projecting surfaces of both the bolt and nut-like member to isolate and force very thin films of resilient material of which the plug is formed against and into contact with the inside wall of the tubular body to provide an especially effective leak-proof seal, as well as to more effectively control the stress applied upon the said wall surface.

These and other features and advantages will be better understood by reference to the following detailed description of specific embodiments and to the accompanying drawings, to which reference is made in the description. Letter subscripts, where used, are used to denote a portion of a given component.

Figure 1:
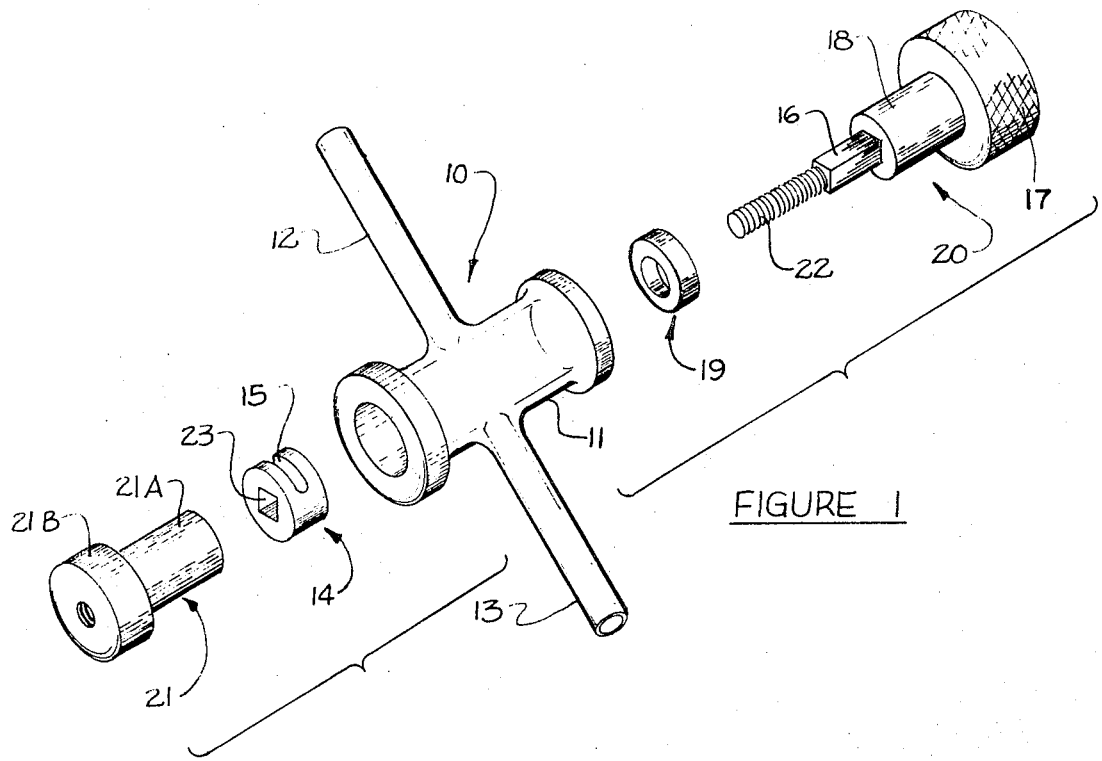
FIG. 1 is an exploded view showing, in perspective, a preferred type of stopcock.

Referring to FIG. 1, there is shown a valve or stopcock 10, useful for stopping or regulating a flow of fluid, i.e., liquid or gas, through a line, conduit, or pipe. Typically, a stopcock is used in glass laboratory apparatus as herein depicted, although such device can be readily employed in any service with minor modifications, especially by varying the materials of which the valve or stopcock 10 is constructed. As illustrated, a tubular housing 11, e.g., a glass barrel, of relatively large cross-sectional diameter, is located between two segments 12,13 of a conduit which open into the said tubular housing 11. In the embodiment depicted, the conduit segments 12,13 are constructed of glass and glass conduit segments 12,13 can be formed as a unitary assembly with the glass barrel or tubular housing 11, although it is quite apparent that a petcock 11, e.g., one constructed of metal, could as well be adjoined to the terminal ends of conduit segments 12,13 of a different material of construction, e.g., metal pipe, via suitable connecting members, e.g., threaded members.

The invention resides in the combination, inclusive of tubular body 11 and conduit segments 12,13, of an externally grooved plug 14, of cylindrical shape and constructed of a resilient or elastic material, which can be fitted snugly within the bore of tubular body 11 so that the circumferential groove 15 will lie directly between and give congress to the axial openings through conduit segments 12,13 which plug 14 can be loaded via a screw or bolt through the plug 14 to place the latter under compression and thus force it to bulge or extrude outwardly against the inside wall of the tubular barrel 11 to form an effective leakproof seal. The groove 15, it will be observed, does not circumscribe the full circumference of the plug 14, and hence does not connect one end with the other even though all points on the groove lie in the same plane. There is always provided a smooth face and a grooved face. The length of groove 15 of plug 14, in all embodiments, is sufficient to provide a path, or communication, for flow of fluid through the axial openings of conduit segments 12,13. The length of the groove 15 encompasses, or circumscribes, an angle equal to or greater than that angle which separates conduit segments 12,13 which, in the specific embodiment shown, is 180°. It is apparent that the length of the groove 15 can vary between an angle equal to or greater than that which separates conduit segments adjoining the stopcock housing up to an angle less than 360°.

A unique feature of the external groove is that the structure is easy to clean and, for that matter, easily disassembled for cleaning. In addition, the location of the groove on the external surface of the plug 14 also causes less distortion of the size and shape of the opening as contrasted with location of an opening through the plug 14, and hence fluid flow is more constant, particularly at extremes in pressure.

Figure 2:
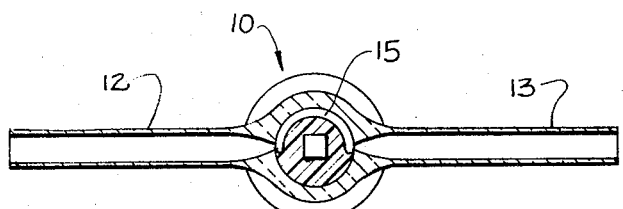
FIG. 2 is a cross-section of the stopcock depicted in the preceding figure, the stopcock being shown in open position.
Figure 3:
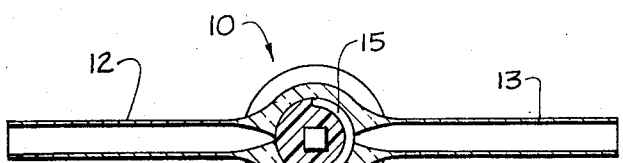
FIG. 3 is a fragmentary cross-sectional view, similar to FIG. 2, except that the stopcock is shown in closed position.

The plug 14 is located, held in place, rotated to effect the opening and closing of the stopcock 10, compressed and formed into an effective leak-proof seal by a bolt 20 comprised of a shaft 16, provided at one end with an enlarged cylindrical segment, head, or externally knurled knob 17, optionally provided with a shank 18 of smaller cross-sectional diameter, and slip ring 19. The opposite end of the shaft 16 is provided with an external screw thread which can be threadably engaged with the nut or nut-like member 21. The nut 21 is of tubular design, being provided with an enlarged head providing a knurled knob portion $21_B$ and a shank portion $21_A$ which can be extended into the axial opening through tubular body 11. Member 21 contains an internal or female screw thread so that the latter member 21 can be adjustably engaged upon shaft 16. The cross-section of the shaft of bolt 20, which lies between shank 18 and the screw thread 22, is of irregular or non-circular cross-section, preferably of rectangular or square cross-section (as shown) corresponding in shape and size with the cross-section of the axial opening 23 through plug 14. Thus, it forms in effect a splined surface providing engagement or meshing between these members. The external cross-sectional diameter of the shank 18 corresponds with the internal diameter of the axial opening through tubular housing 11, within which the said shank 18 can be extended, and its length is such that the portion of the shaft 16, of square cross-section, will project through the axial opening 23 of plug 14 for snug engagement therewith. It will thus be apparent that the effective length of the shaft 16 can be reduced or increased within the axial opening of tubular member 11 by loosening or tightening the nut 21 to lessen or increase the pressure applied upon the opposed faces of plug 14 between the face of slip ring 19 and the end face of nut 21 and thus, to the extent desired, compress the said member 14 and thereby cause it to extrude or bulge outwardly against the inner walls of tubular barrel 11 to form an effective leak-proof seal. It is also apparent, on the one hand, that rotation of knurled knob 17 will rotate plug 14, and that rotation in one direction will open the stopcock by placing conduit segments 12,13 in congress via groove 15 as shown by specific reference to FIG. 2. On the other hand, rotation of the plug 14 so that the smooth side thereof, or side thereof which is not grooved, lies between conduit segments 12,13 as shown by specific reference to FIG. 3, will close communication between the axial openings through conduit segments 12,13 to shut off or interrupt ingress or egress of fluid.

Figure 4:
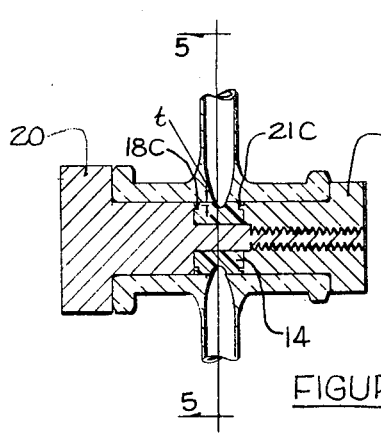
FIG. 4 is a cross-section of a modified stopcock providing an additional sealing feature.

In FIG. 4 there is represented another embodiment wherein the inward face of the shank portion $21_A$ of nut 21 and the inward face of shank portion $18_A$ of shank 18 are each provided with a projecting lip, or relatively sharp cutting edge, or ridge $21_C, 18_C$, which extends around the circumference of the face of each of said members to form, with the plug 14, a particularly effective seal for preventing leakage of fluid into the annular space between the inside wall of tubular housing 11 and the external side of plug 14 in contact therewith. Pursuant to this embodiment, the lips $21_C, 18_C$ bite into the exposed faces of plug 14 and force a thin membrane therefrom upwardly against inside wall of tubular housing 11, while little or no upward force is exerted on that portion of the mass of material forming plug 14 within, or inside, the confines of the walls formed by the lips $21_C, 18_C$. Excessive force, or pressure, against the inside wall of tubular housing 11 is thus avoided. Cold flow of the resilient material of which the plug 14 is constituted is compensated for by gradual tightening of the nut 21 upon the shaft 16. Preferably, the thickness or width of the unenclosed circumferential element of surface (i.e., the unenclosed rim of surface between the external wall of a lip $21_C, 18_C$ and the edge line formed by the external surface of the shank $21_A$), which corresponds substantially with the thickness, $t$, of the film of material projected against the inside wall of tubular housing 11, ranges from about 0.001 to about 0.005 inch, and more preferably from about 0.0015 to about 0.0025 inch. Suitably, the seal is formed as described in U.S. Pat. No. 3,577,850 by Rano J. Harris, Sr., the disclosure of which is herewith incorporated by way of reference.

Figure 5:
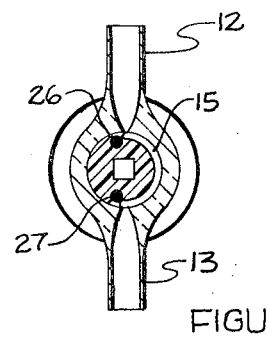
FIG. 5 is a cross-section taken along line 5—5 of FIG. 4 further depicting an additional sealing feature located at the ends of the grooved surface.

In another embodiment, referring to FIG. 5, a pair of pins or studs 26,27 are projected through the plug 14 at the terminal ends of the groove 15 to form a more effective closure, or seal, at these locations.

The plug 14 is constructed of a resilient or elastic material. It is preferably constructed of a rigid or semi-rigid, resilient form of plastic or plastic-like material. The self-lubricated plastics are especially preferred in this capacity. The polyfluorinated ethylene polymers, notable among which is polytetrafluoroethylene (Teflon), are particularly outstanding. Other suitable materials, however, include polyamides, polyesters, polyvinyl chloride and materials sold under the trade names "Nylon," "Perlon" and "Terylene." Natural and synthetic rubbers of various types can also be used.

The tubular housing 11 is suitably constructed of a rigid material, particularly glass or plastic of various types, since the stopcock has particular utility in laboratory glassware such as separatory funnels, burettes, and the like. The housing, however, can also be constructed of conventional materials, preferably metals, particularly metals of the types of which conventional valves are made. Illustrative of such metals are ferrous metals such as iron alloys, steels, stainless steels, and the like; copper, or alloys thereof, such as brass.

The bolt portion of the apparatus, and nut, is also suitably constructed of metals, e.g., iron, iron alloys such as steel, copper, brass and the like.

It is apparent that various changes, such as in absolute or relative dimensions of the parts, materials used, and the like can be made without departing the spirit and scope of the invention, as will be apparent to those skilled in this art.

Having described the invention, what is claimed is:

1. A stopcock, or petcock, comprising
a tubular body, formed by a wall enclosing an axial opening, to the wall of which the terminal ends of tubular conduit segments can be connected such that the said tubular body becomes a juncture within a continuous conduit through which a fluid can be passed via the axial openings through the said tubular conduit segments,
a cylindrical shaped tubular plug, provided with an axial opening of irregular-shaped cross-section therethrough, constructed of a resilient material, rotatably fitted and mounted within the axial opening through the said tubular body, the peripheral curved surface of which is provided with a groove extending through an arc which circumscribes an angle equal to or greater than the angle formed between the locations wherein the tubular conduit segments adjoin or enter into the wall of the tubular body, but less than 360°, such that on rotation of the said plug in one direction the said circumferential groove will lie directly between and give congress to the axial openings through the said tubular conduit segments, and rotation of the said plug in the other direction will interpose the non-grooved segment of the plug between the axial openings through the said tubular conduit segments to close off communication,
a bolt projected through the axial opening of the said tubular body and the axial opening through the cylindrical shaped tubular plug, said bolt including a shaft, a segment of which is splined and mated with the axial opening through the cylindrical shaped tubular plug such that rotation of the bolt will produce a corresponding rotation of the plug, one terminal end of the shaft being externally threaded and the other being provided with a surface of enlarged cross-sectional diameter, with a substantially flat inner face, which extends into the axial opening through the tubular body,
a nut-like threaded tubular member which includes a shank portion, with a substantially flat inner face, which can be extended into the axial opening of the tubular body, the said member being threadably engagable with the threaded shaft portion of the bolt so that it can be rotated thereon and tightened down such that the plug is compressed between the opposed faces of the shank portions of the bolt and nut-like member, respectively, thereby compressing the plug and causing it to bulge outwardly against the inner wall of the tubular body to form an effective leak proof seal.

2. The apparatus of claim 1 wherein the tubular body and connecting conduit segments are constituted of glass, and the tubular plug is constituted of a self-lubricating plastic.

3. The apparatus of claim 2 wherein the tubular plug is constituted of Teflon.

4. The apparatus of claim 1 wherein the tubular plug is held in place within the axial opening of the tubular body via a bolt, which includes a shaft of square cross-section which is projected through the axial opening of the tubular plug of corresponding cross-section and meshed therewith, one terminal end of the shaft being externally threaded while the other is provided with a projection of cross-sectional diameter corresponding with the internal cross-sectional diameter of the axial opening of the tubular housing within which it is projected and an adjacent larger diameter knob, and onto the threaded end of the shaft is engaged a nut-like member, via an internally threaded axial opening, which includes a projection of cross-sectional diameter corresponding with the internal cross-sectional diameter of the axial opening of the tubular body into which the said projection is extended, and an adjacent larger diameter knob.

5. The apparatus of claim 4 wherein the faces of each of the projections of the bolt and nut-like member are flat, and each is provided with a continuous circumferential ridge which, when pressed against the external faces of the tubular plug, forms thin films which are thrust outwardly against the inside wall of the axial opening through the tubular body.

6. The apparatus of claim 5 wherein the outer edges of the ridges are located a distance ranging from about 0.001 inch to about 0.005 inch from the outer edge of the face of the respective projection.

7. The apparatus of claim 6 wherein the distance ranges from about 0.0015 inch to about 0.0025 inch.

8. The apparatus of claim 1 wherein a pair of pins are projected through the plug at the terminal ends of each groove.

9. The apparatus of claim 1 wherein the connecting conduit segments adjoined to the wall of the tubular body are located 180° apart, and the cylindrical shaped resilient tubular plug rotatably mounted within the axial opening of the tubular body is provided with an external groove all points of which lie in the same plane and the arc length subtended by the groove is 180°.

10. The apparatus of claim 9 wherein the tubular body and connecting tubular conduits are constructed of glass and constructed as a unit, and the plug is constituted of Teflon.

11. The apparatus of claim 9 wherein the tubular body and connecting tubular conduits are constructed of metal, and the plug is constituted of Teflon.

* * * * *